United States Patent

[11] 3,583,270

| [72] | Inventor | Edwin James Webb<br>London, England |
|---|---|---|
| [21] | Appl. No. | 765,941 |
| [22] | Filed | Oct. 8, 1968 |
| [45] | Patented | June 8, 1971 |
| [73] | Assignees | Masson Scott Thrissell Engineering Limited<br>London, England;<br>Walmsleys (Wigan) Limited<br>Wigan, a part interest to each |
| [32] | Priority | Oct. 11, 1967 |
| [33] | | Great Britain |
| [31] | | 46,377/67 |

[54] SLITTERS FOR TRAVELLING WEBS
11 Claims, 5 Drawing Figs.

[52] U.S. Cl. .................................................. 83/433,
83/428, 83/499, 83/516, 83/560, 83/700
[51] Int. Cl. .................................................. B26d 7/26
[50] Field of Search .......................................... 83/433,
428, 499, 504, 560, 516, 517, 487, 488, 700

[56] References Cited
UNITED STATES PATENTS

| 1,510,656 | 10/1924 | Clements | 83/504X |
| 1,783,944 | 12/1930 | Sommer | 83/433X |
| 2,591,394 | 4/1952 | Barth | 83/504X |
| 3,176,566 | 4/1965 | Patterson, Jr. | 83/433X |
| 3,176,567 | 4/1965 | McCormick et al. | 83/433X |
| 3,332,326 | 7/1967 | Haas | 83/433X |

Primary Examiner—Frank T. Yost
Attorney—Craig, Antonelli, Stewart and Hill

ABSTRACT: Apparatus for longitudinally slitting a travelling web has rotary cutters on mountings movable across the path of the web, clamps to secure the mountings in selected positions, and adjustable stops for limiting the travel of the mountings, so that while the apparatus is running with the cutters in first positions, the stops may be set and clamped in fresh positions, permitting the positions of the cutters to be quickly altered by releasing the mountings and moving them to the positions defined by the stops.

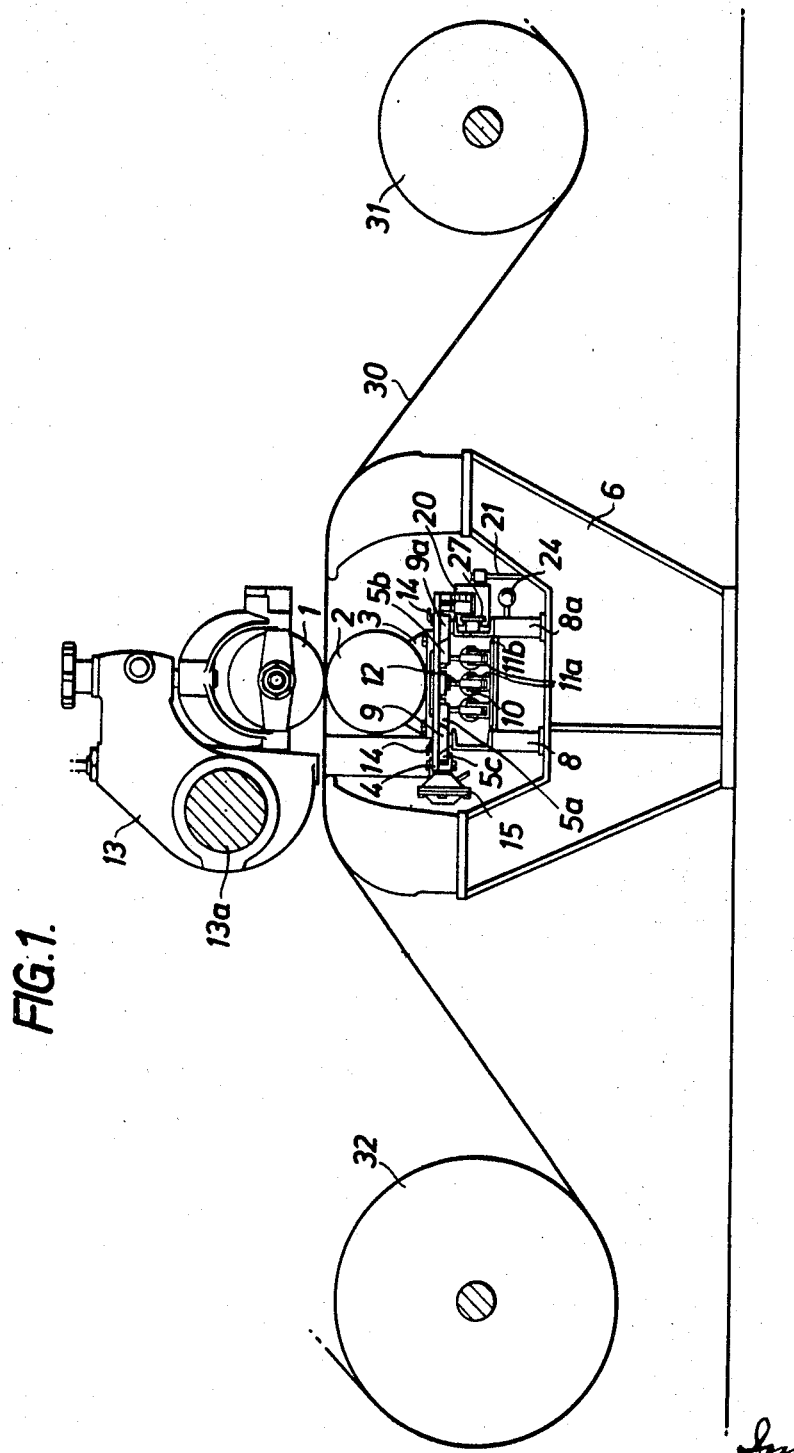

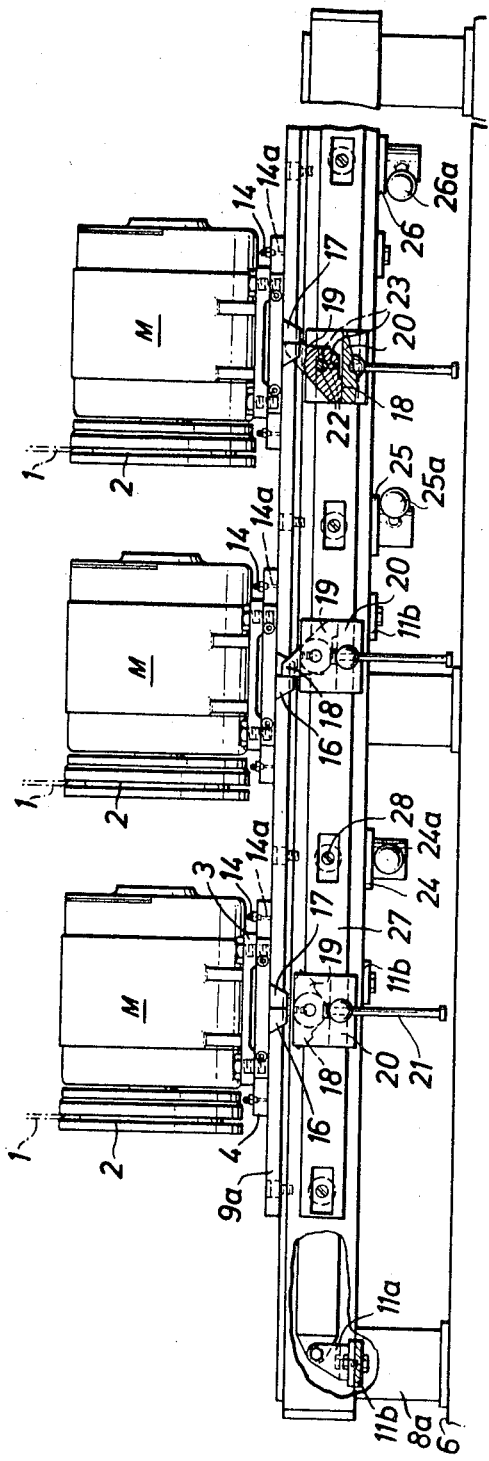

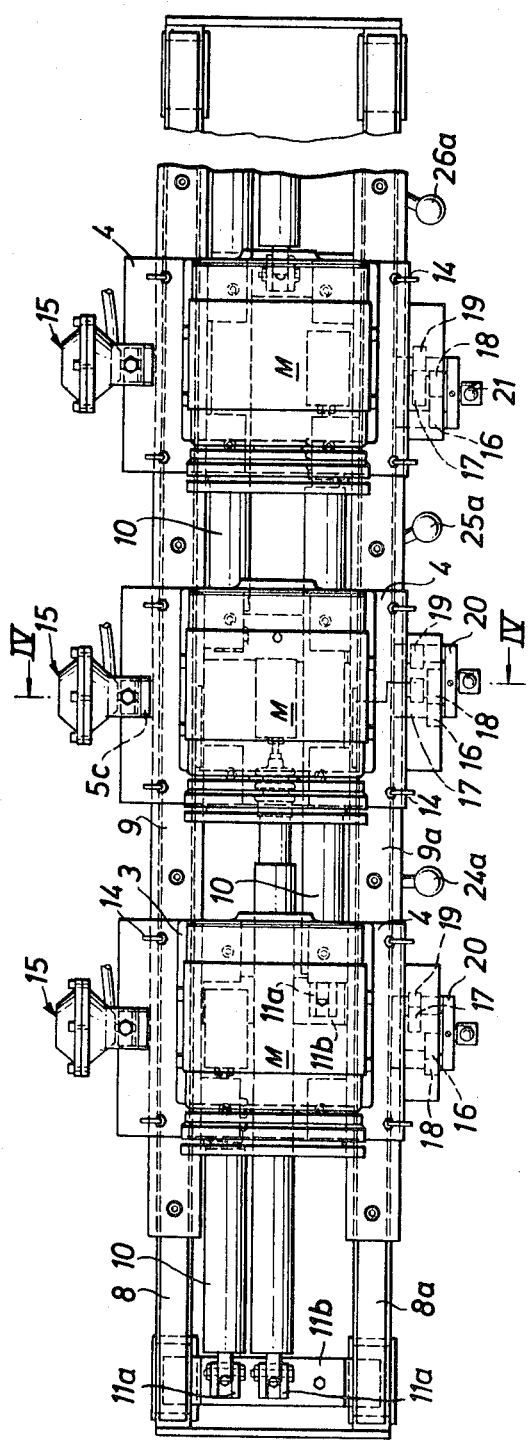

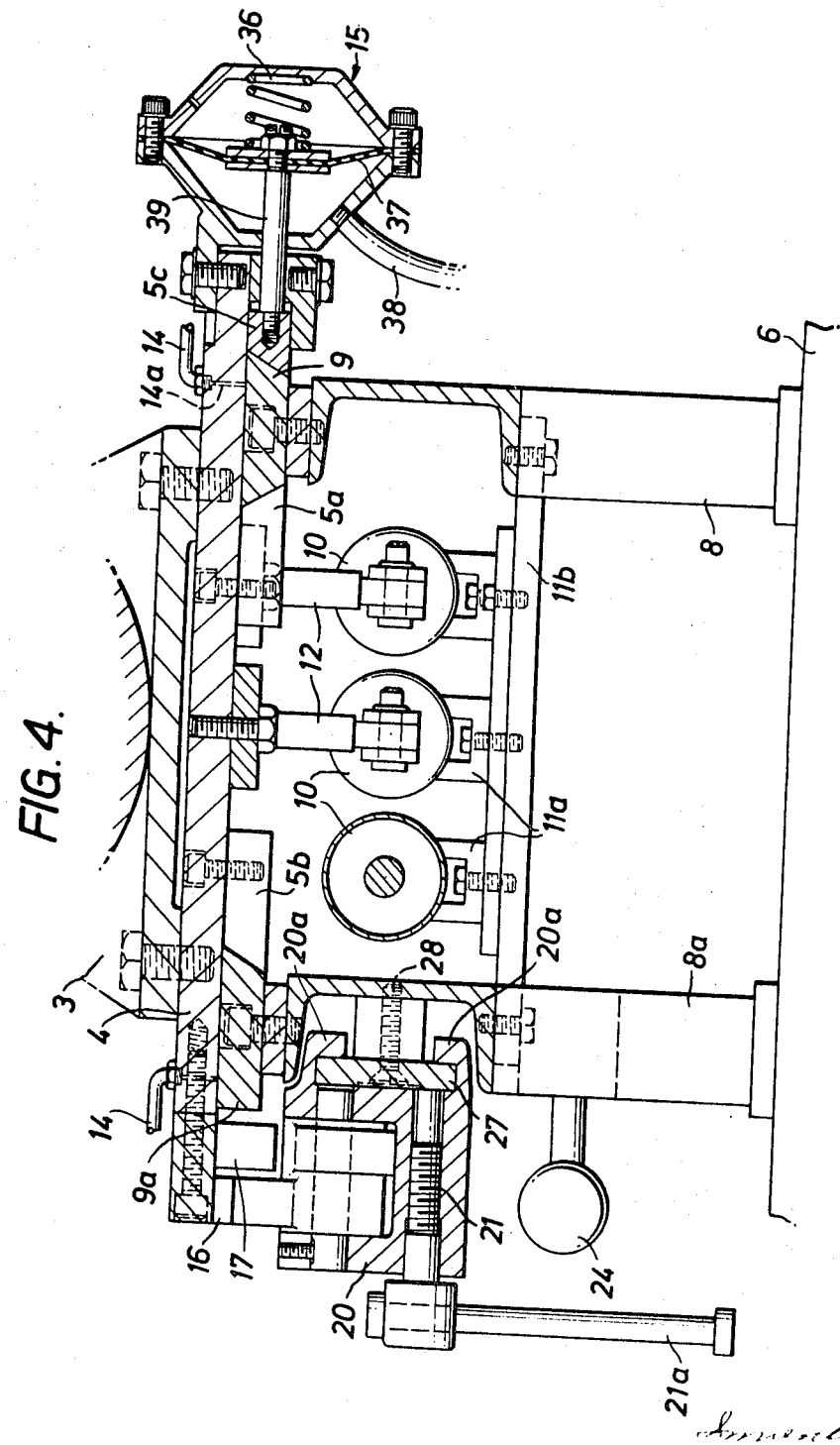

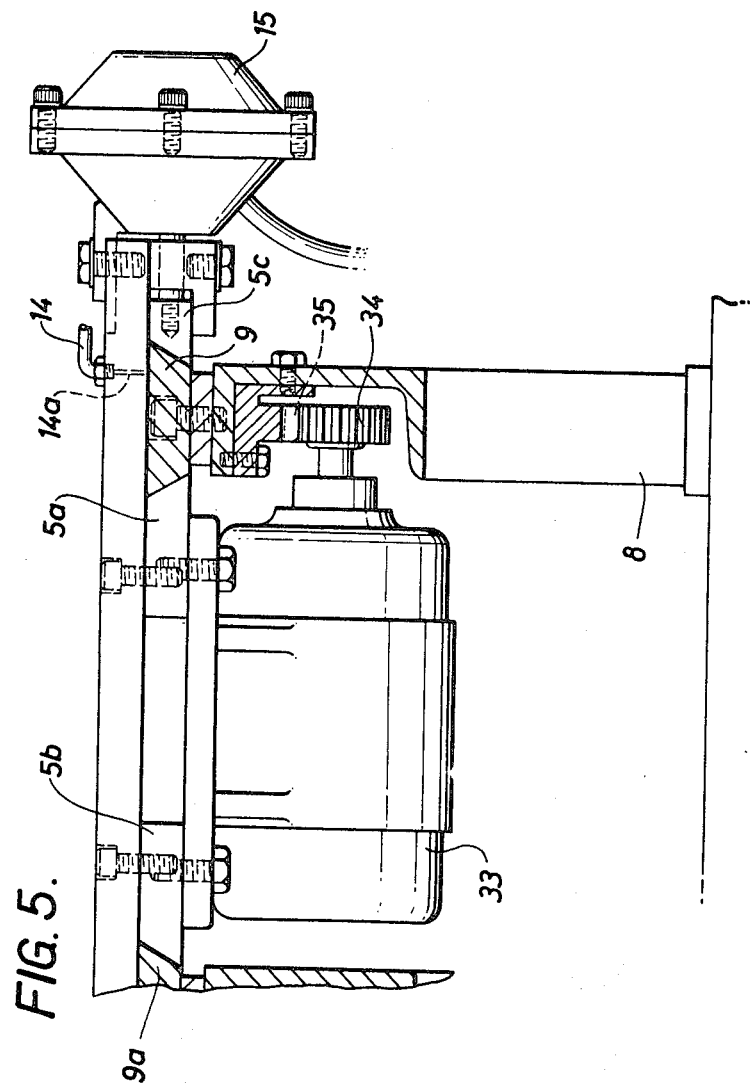

SLITTERS FOR TRAVELLING WEBS

This invention relates to slitters for travelling webs, i.e. machines in which a web of material such as paper is fed past one or more pairs of rotary cutters so that the web is subdivided into two or more narrower webs.

Such machines are operated at high web speeds whenever possible, in the case of paper at speeds of the order of thousands of feet per minute. It is usual to provide for adjustment of the cutters across the path of the web so that the width of the narrower webs produced may be selected as required. However, it has hitherto been normal practice to provide for simple manual adjustment and clamping of the cutters and their supports, hence it has been necessary to stop such a machine whenever adjustment of the cutters is to be made and these stoppages in many cases (because of the high speeds employed) cause a serious reduction in the productivity of the machine.

It is an object of the present invention to provide an improved form of apparatus for longitudinally slitting a travelling web in which changes of cutter position may be effected more rapidly than hitherto.

According to the invention there is provided apparatus for longitudinally slitting a travelling web of paper or the like comprising means for feeding said web along a defined path past at least one pair of rotary cutters, at least one cutter of said pair being carried by a mounting arranged for movement across said path, including movable stop means adapted to limit said movement of said mounting and independently operable clamping means for said mounting and for said stop means, so that the stop means may be moved while the mounting is clamped in one selected position and thereafter the mounting may be moved to another selected position defined by the stop means.

With such apparatus it will be appreciated that, although it is still generally desirable to stop the feed of the web when the position of the cutters is to be changed, the time of such stoppage may be kept to a minimum as all that it is necessary to do during the stoppage is to unclamp the cutter mounting, move it until it encounters the stop means and then clamp the mounting again. Feeding of the web may then be restarted and while the web is travelling the stop means may be unclamped and set to a new position in preparation for the next occasion on which the position of the cutters is to be changed.

The mounting for the cutter or cutters is preferably slidable upon rails and as such a mounting and cutter assembly may be of considerable weight we prefer to provide means for the introduction of air under pressure between the supporting surfaces of the mounting and of the rails whenever the mounting is to be moved so as to provide a form of air bearing and thus reduce the effort required to move the mounting. Conveniently also we provide some form of power means to apply the necessary effort to the mounting to change its position; preferably this takes the form of a hydraulic actuator.

The mounting may be clamped in position in a variety of ways but we prefer to employ a clamping device which is normally held by a spring in a clamping position against one of the rails on which the mounting slides and to arrange a power device such as a pneumatic actuator to release the clamp when the mounting is to be moved. It is particularly preferred to provide a common control for the hydraulic actuator or other power device for moving the mounting and for the pneumatic actuator or the like for releasing the clamp.

The stop means will in virtually every case be much lighter than the mounting and in general plenty of time will be available for resetting the stop means, hence any convenient form of manually operable clamp may be employed here.

The mounting may carry only one cutter of a pair in which case the second cutter may be adjusted after the mounting has been moved to a fresh position defined by the stop means. Alternatively the two cutters of a pair may be coupled so that movement of the mounting alters the position of both cutters simultaneously, e.g. by arranging the cutters and their support as shown in British Pat. Specification No. 668,233.

The positioning of the stop means may be determined by the operator using conventional measuring devices such as rulers or measuring bars precut to appropriate lengths. However, in an apparatus where changes of cutter position may be required very frequently, measurement of the position of the stop means may be made more speedy by including some form of measuring device in the structure of the apparatus, e.g. the stop means could be provided with a scanning device arranged to read digitally coded markings on a measuring strip extending across the apparatus, the scanning device being connected to a display unit so as to give an operator an immediate digital indication of the position of the stop means.

The use of the use of air bearings as mentioned above has a particular advantage when applied to apparatus dealing with webs of material such as paper in which the slitting operation is always accompanied by the production of substantial quantities of dust which tends to clog mechanical parts such as slides. The use of air bearings as generally described above tends to remove this clogging in part because the air applied blows away the dust each time the cutter mounting is moved and in part because the application of compressed air separates the supporting surface by a small distance so that the mounting may easily be moved even although the rails on which it is carried may have an appreciable dust coating.

The above and various other preferred features of the invention will be better understood from the following description of a preferred embodiment thereof in which reference is made to the accompanying drawings in which:

FIG. 1 is a side elevation of a paper slitter, in partial section,
FIG. 2 is an end elevation of the apparatus of FIG. 1,
FIG. 3 is a plan view of the apparatus of FIG. 1,
FIG. 4 is a section on the line IV–IV of FIG. 3, and
FIG. 5 shows an alternative arrangement of a part of the apparatus of FIG. 1.

In the apparatus shown, a paper web 30 is fed round a roller 31 and through a slitter with a number of sets of paper cutters 1 and 2 to a second roller 32 (FIG. 1), three of said sets being shown. In each set of cutters, the lower cutter 2 with its driving motor M is mounted on a table 3 which is secured to a platform 4 with slide members 5a and 5b. The slitter has a base 6 on which there are mounted several pairs of pillars 8, 8a. At their upper ends said pillars 8 and 8a carry rails 9, 9a which engage the slide members 5a, 5b. Hydraulic actuator cylinders 10 are carried by means of supports 11a secured to crossbars 11b carried between the pillars 8, 8a and each cylinder 10 has its ram linked by a connecting member 12 to one of the platforms 4, thus providing means for driving the platform 4 along the rails 9, 9a. The upper cutter 1 is mounted in the paper slitter by means of a support 13 clamped to a supporting bar 13a; the support 13 as shown is movable independently of the table 3 and lower cutter 2 but may be coupled (e.g. as shown in the aforementioned specification) to the table 3 for joint movement of the cutters. Air inlets 14 are provided on the platform 4 and each such inlet communicates with a drilling 14a through said platform so that when the platform 4 is to be moved, air may be introduced through the drilling 14a to provide air bearings between the platform 4 and the rails 9, 9a. A pneumatic actuator 15 is secured to the platform 4 and connected to clamping shoes 5c which coact with the slide member 5a to grip the rail 9 for fixing the position of the platform.

Each platform 4 is associated with a pair of downwardly projecting lugs 16, 17 which are engageable with stops 18, 19 respectively.

The pair of stops 18, 19 are secured together and pivotally mounted in a stop carrier 20 which is slidable along a mounting bar 27, said stop carrier 20 having supporting lugs 20a embracing the bar 27. The carrier 20 can be secured at any desired position along the bar 27 by means of a clamping screw 21, operated by hand lever 21a, and the bar 27 is secured to pillars 8a by bolts 28.

Each pair of stops 18, 19 may be set in any of three positions on its pivot, and the three sets of stops associated with the three sets of cutters 1, 2 are shown in FIG. 2 in different ones of these positions. The stops of the right-hand pair (as seen in FIG. 2) are set with the stop 19 projecting upward and engaged by lug 17, the stop 18 being engaged with the carrier 20; the stops of the central pair are set with the stop 18 projecting upward and engaged by lug 16, while the stop 19 is engaged with the carrier 20; and the stops 18, 19 of the left-hand pair are set in an intermediate (and inoperative) position in which neither stop is engageable by lugs 16, 17 or engaged with carrier 20. It will be seen that, whenever either stop is projecting upward, any horizontal force or impact upon its vertical face cannot rotate the stop, due to the engagement between the other stop and the carrier 20.

The operative positions of each pair of stops are those shown in the right-hand and central pairs of FIG. 2, i.e. with either stop 18 or stop 19 projecting upwardly for engagement by lug 16 or lug 17 respectively. It will be apparent that engagement between one of the lugs 16 and the related stop 18 will prevent the platform 4 associated with that lug from moving to the right (as seen in FIG. 2) while engagement between one of the lugs 17 and the related stop 19 will similarly prevent movement to the left. The intermediate position of each pair of stops is termed an inoperative position because in that position neither of the stops 18, 19 is engageable by its associated lug 16, 17.

Sprung balls 23 are arranged to engage recesses 22 in the pivot shaft of each pair of stops 18, 19 to provide ready location of each pair of stops in their operative positions.

Valves 24, 25, 26, having operating handles 24a, 25a, 26a respectively, are provided for control of the hydraulic actuator cylinders 10. Each of the valves 24, 25, 26 has three settings; with the control handle in a central position (as handle 24a is shown in FIG. 2) the corresponding cylinder 10 is not energized (i.e. its connections to hydraulic supply are closed) its return pipes (not shown) being however open for a reason to be explained; with the control handle in each of its other positions (as handles 25a, 26a are shown in FIG. 2) the corresponding cylinder is energized, one of these positions so connecting the cylinder to said supply and return pipes as to drive the associated carriage to the right while the second of these positions provides connections resulting in drive to the left (again as seen in FIG. 2). Thus the position of the three handles 24a, 25a, 26a shown in FIG. 2 may respectively be termed "Neutral," "Move to Right," and "Move to Left."

Each platform can be clamped in any position (within the stroke of its associated actuator 10) along the rails 9, 9a by the clamping shoe 5c, (FIG. 4), which is normally pressed against the rail 9 by a spring 36 acting through a push-rod 39. The spring 36 is contained within the body of the pneumatic actuator 15 and serves to bias a diaphragm 37 which is also connected to the push-rod 39. The diaphragm 37 divides the interior of said body into two chambers, the right-hand one (as seen in FIG. 4) being vented to atmosphere while the left-hand one can be supplied with compressed air through pipe 38. When compressed air is admitted to the left-hand chamber, the diaphragm 37 moves to compress spring 36 and relax the pressure of shoe 5c on the rail 9. Simultaneously, as air also reaches the inlets 14, the air bearing is created between the platform 5 and the rails 9, 9a. The platform is then free to slide along the rails 9, 9a, altering the position of the cutter carried on the platform. The hydraulic actuator 10 linked to the platform then causes the latter to move in the direction determined by the setting of the associated valve 24, 25 or 26 until the lug 16 encounters stop 18 if the platform is moving to the right, or until lug 17 encounters stop 19 in the case of movement to the left.

It will be appreciated that the hydraulic actuator 10 need not provide a large thrust, in view of the relative ease of movement of the platform on its air bearing; hence the stops 18, 19 can and do stop the platform although the actuator 10 is still energized. Once the platform has been stopped the valve 24, 25 or 26 may be restored to the "Neutral" setting so that actuator 10 ceases to be energized, and air supply may be cut off from inlets 14 (as the air bearing is no longer needed) and from the pneumatic actuator 15, so that shoe 5c is again pressed against rail 9 to clamp the platform in its new position.

While the movement of the cutters to new positions may be effected by manual operation of the valves 24, 25, 26, it is preferred to reset all the cutters simultaneously and for this purpose the apparatus is also provided with a master valve (not shown) for turning on and off simultaneously all the hydraulic and pneumatic supplies. For each change of cutter positions the stops are suitably set and clamped, and the valves 24, 25, 26, are placed in their "Move to Left" or "Move to Right" positions as appropriate, the master valve being off while this presetting is performed. The master valve is opened at the time when the cutters are required to be reset, and all the hydraulic actuators 10 and pneumatic actuators 15 are energized at once (unless, of course, the position of any cutter is to remain unchanged, in which event the corresponding valve 24, 25 or 26 will have been left in the "Neutral" position) and the platforms 4 are moved until the lugs 16, 17 encounter stops 18, 19. Once all the platforms have ceased moving, the master valve is turned off again, so that all actuators are deenergized and the platforms 4 are clamped in their new positions.

Once all the platforms 4 are again clamped, each stop assembly may be reset to any desired position, in preparation for the next required move of the associated platform with its cutter. If such resetting requires that the stop assembly be moved past the lugs 16, 17 (e.g. if the stop assembly shown centrally in FIG. 2 is to be moved to the left) this may be done if the stop assembly is first moved a little in the opposite direction (i.e. to the right in the case of the central assembly of FIG. 2) and the stop assembly then set in its inoperative position (i.e. as illustrated in the left-hand assembly of FIG. 2).

At some times, not all the cutters provided may be required, and the superfluous cutters will be rendered inoperative, the cutter being raised away from the path of the web. However, an idle cutter platform may at times be found to be in the way of a neighboring cutter platform being moved to a new position. The idle unit has its hydraulic valves set at "Neutral" and hence is not driven when the master hydraulic valve is open, but if engaged by another platform 4, the idle unit offers little resistance to movement, as its hydraulic return pipes are open and its air supply is on.

In FIG. 5 there is shown an alternative arrangement, in which an electric motor 33 replaces the hydraulic actuator 10. The motor 33 is secured to the slide members 5a, 5b under the platform so that said motor 33 moves with the platform, and drives a pinion 34 which engages a stationary rack 35 mounted on the pillar 8. With this arrangement it will be appreciated that in place of each of the valves 24, 25, 26, there is provided an electric switch (not shown) which in function is analogous to the superseded hydraulic valve, i.e. said switch provides for energization of the motor 33 to run in one or the other direction when the "Move to Right" or "Move to Left" setting is selected, and disconnects the motor 33 when the "Neutral" setting is selected. It is desirable to provide a slipping clutch (not shown) between the motor 33 and pinion 34; without this either the motor 33 must be capable of remaining stalled (when the lug 16 or 17 has engaged the stop 18 or 19 and hence the platform cannot be moved further) for some time without damage, or some form of automatic cutout for the motor 33 must be provided, e.g. by fitting limit switches in lugs 16, 17 or in stops 18, 19.

What I claim as my invention and desire to secure by Letters Patent is:

1. Apparatus for longitudinally slitting a traveling web of paper or the like comprising means for feeding said web along a defined path, at least one cutter, a mounting for said cutter, said mounting being arranged for movement across said path parallel to the plane of said web, movable stop means disposed solely on one side of the path of the web for limiting movement of said mounting, releasable clamping means for said mounting, and releasable clamping means for said stop means, the respective clamping means being independently operable so that the stop means may be moved while the mounting is clamped in one selected position and thereafter the mounting may be moved to another selected position defined by the stop means.

2. Apparatus as claimed in claim 1, further comprising at least one rail, said mounting for said cutter being slidable upon said rail.

3. Apparatus as claimed in claim 2, in which the releasable clamping means for the mounting comprises a clamping device including biasing means for retaining said clamping device in a clamping position against said rail and a power device operable to release the clamping device.

4. Apparatus as claimed in claim 3, in which said power device is a pneumatic actuator.

5. Apparatus as claimed in claim 2, including means for introducing air under pressure between supporting surfaces of the mounting and of the rail to provide an air bearing whereby said mounting may be easily moved along said rail.

6. Apparatus as claimed in claim 1, including power means for moving the mounting to change its position.

7. Apparatus as claimed in claim 3, including power means for moving the mounting to change its position and a common control for operating the power means and the power device.

8. Apparatus as claimed in claim 6, in which said power means is a hydraulic actuator.

9. Apparatus as claimed in claim 6, in which said power means is an electric motor.

10. Apparatus as claimed in claim 1, in which the releasable clamping means for each stop means comprises a manually operable clamp.

11. Apparatus as claimed in claim 1, in which each stop means is settable to any one of three positions comprising a first position in which the stop means is operative to prevent movement of the mounting therepast in one direction, a second position in which said stop means is inoperative, and a third position in which the stop means is operative to prevent movement of the mounting therepast in the opposite direction.